US011361664B2

(12) United States Patent
Grabowski et al.

(10) Patent No.: US 11,361,664 B2
(45) Date of Patent: Jun. 14, 2022

(54) INTEGRATION OF UNMANNED AERIAL SYSTEM DATA WITH STRUCTURED AND UNSTRUCTURED INFORMATION FOR DECISION SUPPORT

(71) Applicants:Martha Grabowski, Cazenovia, NY (US); Kristi Lynn Gloude, West Monroe, NY (US)

(72) Inventors: Martha Grabowski, Cazenovia, NY (US); Kristi Lynn Gloude, West Monroe, NY (US)

( * ) Notice: Subject to any disclaimer, the term of this patent is extended or adjusted under 35 U.S.C. 154(b) by 139 days.

(21) Appl. No.: 17/066,553

(22) Filed: Oct. 9, 2020

(65) Prior Publication Data

US 2021/0110721 A1 Apr. 15, 2021

Related U.S. Application Data

(60) Provisional application No. 62/913,927, filed on Oct. 11, 2019.

(51) Int. Cl.
| | |
|---|---|
| *G08G 5/00* | (2006.01) |
| *G06T 11/00* | (2006.01) |
| *G06F 3/04817* | (2022.01) |
| *G06N 20/00* | (2019.01) |
| *G06F 16/29* | (2019.01) |

(52) U.S. Cl.
CPC ....... *G08G 5/0017* (2013.01); *G06F 3/04817* (2013.01); *G06F 16/29* (2019.01); *G06N 20/00* (2019.01); *G06T 11/00* (2013.01); *G08G 5/003* (2013.01); *G08G 5/0047* (2013.01); *G06T 2200/24* (2013.01)

(58) Field of Classification Search
CPC .................................................. G08G 5/0017
USPC ........................................................ 701/439
See application file for complete search history.

(56) References Cited

U.S. PATENT DOCUMENTS

| 6,268,798 B1 * | 7/2001 | Dymek ................. G08B 21/02 340/8.1 |
| 8,296,063 B1 * | 10/2012 | Baillot ................... G01C 21/16 701/434 |
| 10,105,108 B1 * | 10/2018 | Taptelis ................. G16H 80/00 |
| 2007/0030144 A1 * | 2/2007 | Titus ..................... G08B 25/006 340/506 |
| 2008/0077326 A1 * | 3/2008 | Funk .................... G08B 25/016 701/500 |

(Continued)

*Primary Examiner* — Reza Nabi
(74) *Attorney, Agent, or Firm* — Hoffman Warnick LLC

(57) ABSTRACT

A system and method that system for provide visual decision support information. A disclosed system performs a process that includes: storing a set of layers of GIS data associated with a safety critical use case; in response to an active incident, integrating UAS incident data with the GIS data and generating a visual decision support interface that includes a flight plan overlaid onto the GIS data, wherein the flight plan includes a path with interactive points that link images taken by a UAS to geospatial locations in the GIS data; in further response to the active incident, integrating at least one of: weather, thermal image, social media, RFID, machine learning, animation, graphic, haptic sensor, holographic or virtual image, emoji, or video data, with the GIS data to provide additional visual information to the visual decision support interface; and displaying the visual decision support interface on at least one display.

5 Claims, 12 Drawing Sheets

(56) References Cited

U.S. PATENT DOCUMENTS

| | | | | |
|---|---|---|---|---|
| 2008/0192731 A1* | 8/2008 | Dickinson | ......... | H04M 3/42357 370/352 |
| 2013/0147621 A1* | 6/2013 | Kwong | ............ | A62B 3/00 340/521 |
| 2013/0278420 A1* | 10/2013 | Araiz-Boys | ............ | G08B 21/10 340/539.18 |
| 2017/0178490 A1* | 6/2017 | Kozloski | ............. | G08B 21/043 |
| 2017/0236426 A1* | 8/2017 | Kleywegt | ............ | G08G 5/0013 340/994 |
| 2017/0280107 A1* | 9/2017 | Wood | .................... | G06V 20/52 |
| 2018/0033312 A1* | 2/2018 | De | ..................... | G08G 5/0017 |
| 2018/0150928 A1* | 5/2018 | Dejewski | ............. | G06Q 50/265 |
| 2018/0292213 A1* | 10/2018 | Grabowski | ............. | G01S 19/13 |
| 2019/0174208 A1* | 6/2019 | Speicher | .................. | H04Q 9/00 |
| 2019/0279506 A1* | 9/2019 | Kelgernon | ........... | G08G 1/0962 |
| 2020/0026289 A1* | 1/2020 | Alvarez | ................ | G07C 5/085 |
| 2020/0349852 A1* | 11/2020 | DiCosola | ............ | G06Q 10/0832 |
| 2021/0074288 A1* | 3/2021 | Stefanski | ............ | G10L 15/1822 |
| 2021/0110721 A1* | 4/2021 | Grabowski | ........... | G08G 5/0034 |
| 2021/0152687 A1* | 5/2021 | Reber | ................. | H04L 65/4076 |
| 2021/0398434 A1* | 12/2021 | Madden | ............... | G08G 5/0013 |
| 2022/0036721 A1* | 2/2022 | Wu | ........................ | H04W 4/02 |

\* cited by examiner

INTEGRATION OF UNMANNED AERIAL SYSTEM DATA WITH STRUCTURED AND UNSTRUCTURED INFORMATION FOR DECISION SUPPORT

BACKGROUND OF THE DISCLOSURE

Safety-critical systems, including those involving mission critical and emergency responses, require experienced personnel to make timely and critical decisions in response to various types of incoming data. For example, in order to obtain the best possible outcome, fire firefighters confronted with a burning building must, e.g., be able to quickly determine the location of the fire in the building, the layout of the building, the location of any people in the building, etc. Typically, however, such information is received from disparate information sources over an unpredictable timeline, which must then be synthesized manually by a decision maker, who then directs the deployment of resources.

BRIEF DESCRIPTION OF THE DISCLOSURE

Aspects of this disclosure provide a system and method that integrates unmanned aerial system (UAS) data with structured and unstructured information, and provides integrated data visualization for real-time decision support in safety-critical systems.

A first aspect of the disclosure provides a system for providing visual decision support information, comprising: a memory; and a processor coupled to the memory and configured to perform a process that includes: storing a set of layers of core geographic information system (GIS) data associated with a safety critical use case; in response to an active incident, integrating unmanned aerial system (UAS) incident data with the core GIS data and generating a visual decision support interface that includes a flight plan overlaid onto the core GIS data, wherein the flight plan includes a path with interactive points that link images taken by a UAS to geospatial locations in the core GIS data; in further response to the active incident, integrating at least one of: weather data, thermal image data, social media data, RFID data, machine learning generated data, animation data, graphic data, icons, haptic sensor data, holographic or virtual images, emojis, or video data, with the core GIS data to provide additional visual information to the visual decision support interface; and displaying the visual decision support interface on at least one augmented reality (AR) display.

A second aspect of the disclosure provides a method for providing visual decision support information, comprising: storing a set of layers of core geographic information system (GIS) data associated with a safety critical use case; in response to an active incident, integrating unmanned aerial system (UAS) incident data with the core GIS data and generating a visual decision support interface that includes a flight plan overlaid onto the core GIS data, wherein the flight plan includes a path with interactive points that link images taken by a UAS to geospatial locations in the core GIS data; in further response to the active incident, integrating at least one of: weather data, thermal image data, social media data, RFID data, machine learning generated data, animation data, graphic data, haptic sensor data, holographic or virtual images, emojis, or video data, with the core GIS data to provide additional visual information to the visual decision support interface; and displaying the visual decision support interface on at least one augmented reality (AR) display.

The illustrative aspects of the present disclosure are designed to solve the problems herein described and/or other problems not discussed.

BRIEF DESCRIPTION OF THE DRAWINGS

These and other features of this disclosure will be more readily understood from the following detailed description of the various aspects of the disclosure taken in conjunction with the accompanying drawings that depict various embodiments of the disclosure, in which.

The drawings are intended to depict only typical aspects of the disclosure, and therefore should not be considered as limiting the scope of the disclosure.

DETAILED DESCRIPTION OF THE DISCLOSURE

Embodiments of the disclosure provide technical solutions for providing real time visual decision support information to personnel in safety-critical environments. In the described solutions, unmanned aerial system (UAS) imagery data is integrated with structured and unstructured information, and rendered on an interactive display in real time to help personnel make time critical decisions.

In many safety critical environments in which decisions must be made quickly, such as with first responders in emergency situations, information may be gathered from any number of sources by command personnel, who must then deploy resources to address the emergency. Such information may, e.g., include: incident based information, e.g., the nature, location, and status of the emergency and available resources; site information, e.g., building layout, prior incidents at the location, location of fixed resources such as fire hydrants, etc.; and visual information, e.g., image data, streaming video, etc. Such information may be gathered by various disparate technologies. For example, firefighters, police and military may use spatial data in the form of maps with head mounted displays (HMDs) while at operational scenes. In other cases, thermal imaging systems may be used to detect people and hot spots in fires. In still other cases, a video feed from a UAS (e.g., a drone), a vehicle or a body camera can be collected and provided to command personnel. The synthesis of such data by decision support personnel is critical for improving command decision-making. For example, in order for a firefighter to safely rescue a person in a burning building, thermal imaging could facilitate how the fire is behaving, while a video feed from a UAS may be used verify the exact location of the person.

In the current state of the art, such information tends to be collected from various disparate sources and is made available to decision makers in disparate forms at unpredictable times. For example, in responding to a fire, a live video feed may be displayed on a first system, while a building layout may only be made available on a second system. Further, as the emergency unfolds, the responders must be able to process and react to unforeseen issues, such as changes to the building layout. The present approach integrates UAS data with structured and unstructured information in an augmented reality display in real time to provide enhanced support to decision making personnel.

Figure 1:
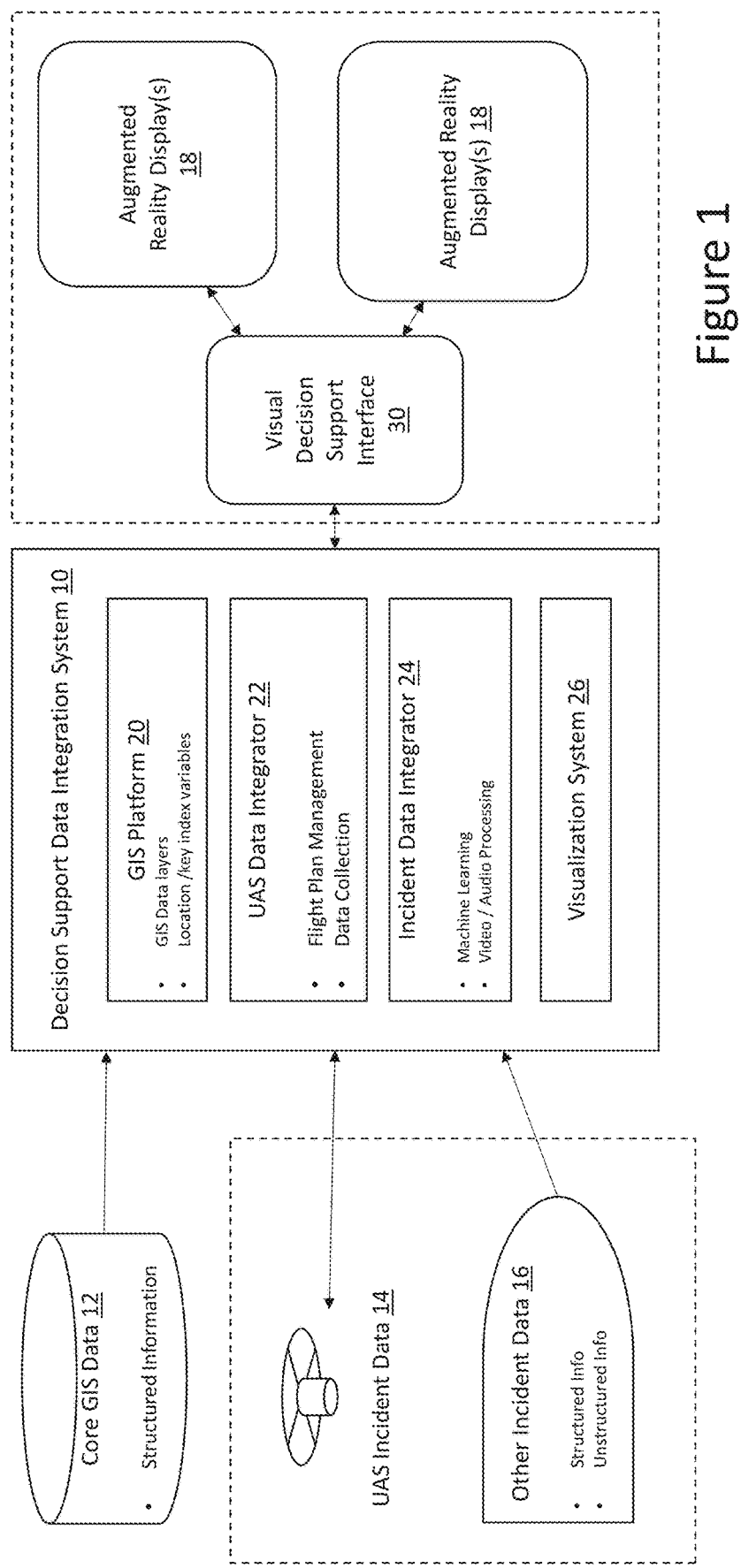
FIG. 1 depicts an illustrative decision support data integration system, in accordance with an illustrative embodiment.

FIG. 1 depicts an illustrative decision support data integration system 10 that generates a visual decision support interface 30 that provides visual information of an active or training-based "incident" that can be rendered on one or more augmented reality displays 18. In this embodiment, system 10 processes and integrates real time information, including UAS incident data 14 (i.e., video data collected from a drone) and other incident data 16 (e.g., weather data, social media feeds, etc.), with core geographic information system (GIS) data 12 (i.e., structured information).

Augmented reality (AR) display 18 may include any system capable of rendering visual information within an interactive platform, e.g., a tablet, smart glasses, a wearable, a smart device, augmented reality glasses, a heads up display, a holographic display, etc. The visual information displayed on AR display may for example include a holograph, animation, two or three dimensional image data, a projection, etc.

Figure 2:
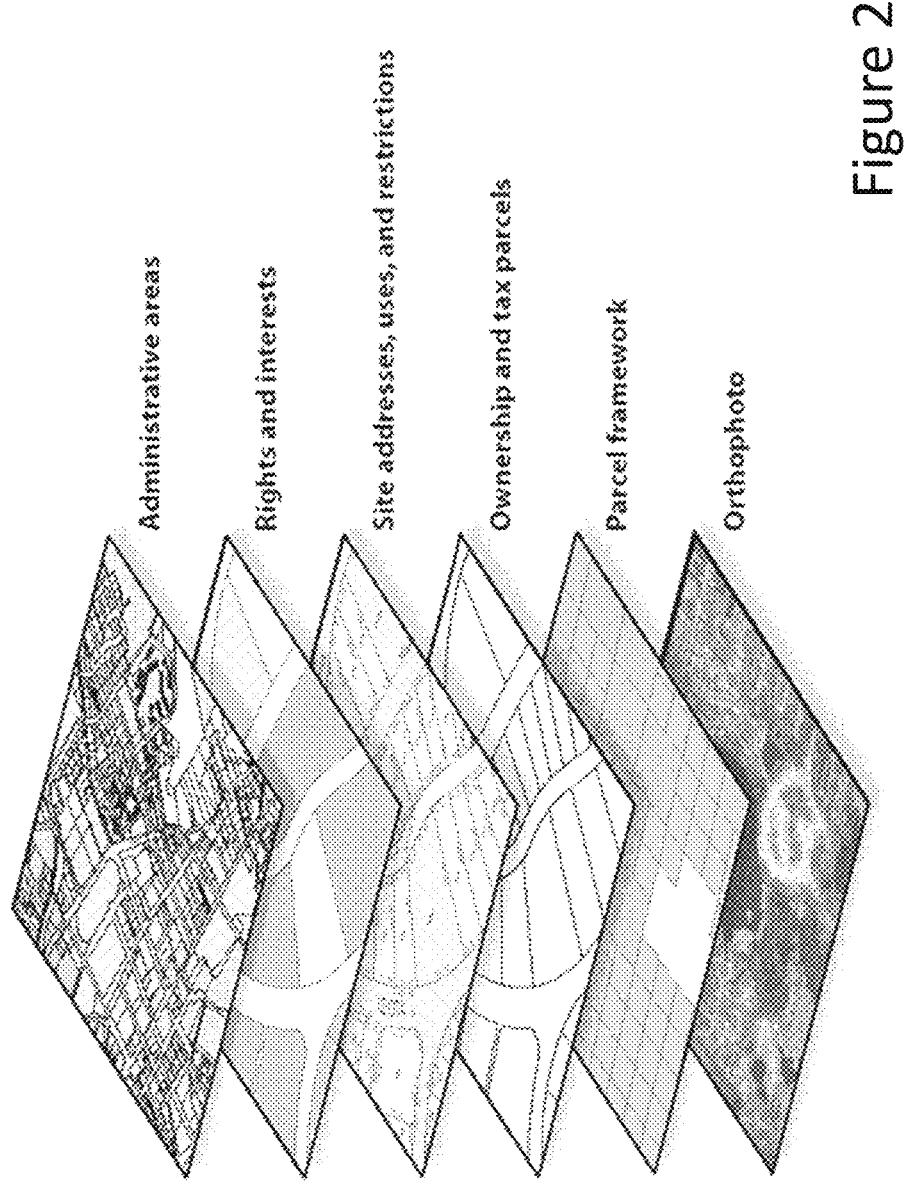
FIG. 2 depicts a view of sample GIS data, in accordance with an illustrative embodiment.

Central to the decision support data integration system 10 is a GIS platform 20 that manages layers of geospatial data. GIS platform 20 provides a conceptualized framework having the ability to capture and analyze spatial and geographic data. Geographic information systems are utilized in multiple technologies, processes, techniques and methods, and are commonly deployed in numerous applications, including: engineering, planning, management, transport/logistics, insurance, telecommunications, and business. FIG. 2 depicts an illustrative GIS layered framework for a municipality, which includes different classes (i.e., layers) of data such as administrative data, rights and interest data, address/uses/rights data, ownership and tax data, parcel data, and photographic data.

GIS platform 20 uses spatio-temporal (space-time) locations as the key index variable for all other information. Just as a relational database containing text or numbers can relate many different tables using common key index variables, GIS platform 20 can relate otherwise unrelated information by using location as the key index variable. The key is the location and/or extent in space-time. Any variable that can be located spatially can be referenced using GIS platform 20.

In an illustrative embodiment in which system 10 is configured for a fire fighting response, the core GIS data 12 inputted into system 10 can include various layers of data useful for fire fighters, such as: municipal infrastructure data, building structure data, building inspection data, fire hydrant flow and pressure data, code violation data, equipment inventory data, fire and emergency incident data, violation data, etc.

Figure 3:
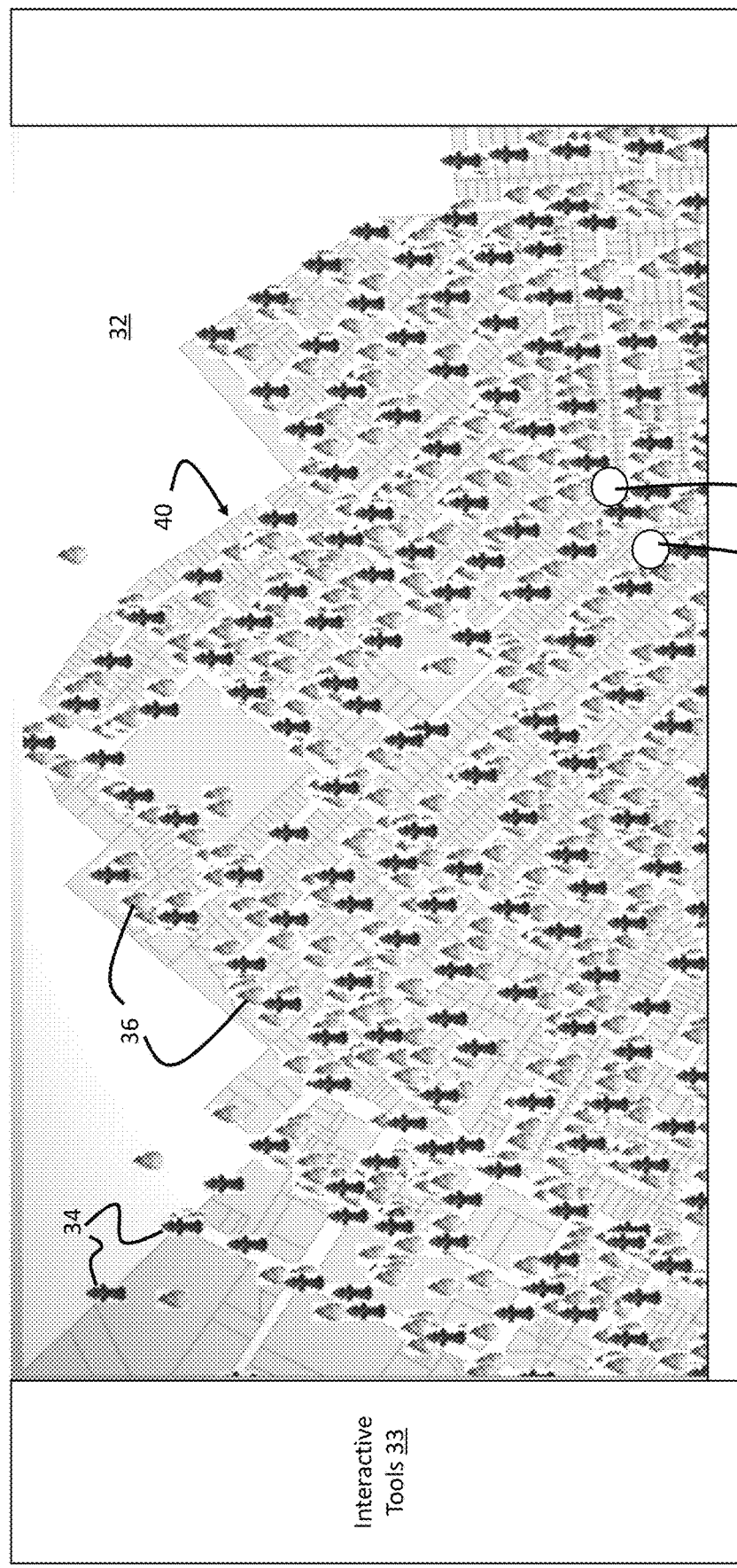
FIG. 3 depicts an interface view of GIS data, in accordance with an illustrative embodiment.

FIG. 3 depicts an illustrative interface 30 showing layered GIS information that includes a parcel map 40, a layer of fire hydrant location data 34, a layer of prior incident data 36, and a layer of prior lead violation data 38. Other GIS layers could include, e.g., visualizations of different types of prior incidents (e.g., fire, code violations), infrastructure details, building inspection violations, hydrant pressure, hose locations, etc., which could be incorporated into the depicted view. Interface 30 generally includes a visual display area 32 for showing visual information and interface tools 33 for controlling views, determining what visual information to display, etc.

It is understood that the particular types of core GIS data 12 loaded into system 10 will vary depending on the particular type of decision support use case application being deployed (illustrative use cases include, e.g., firefighter response, search and rescue, oil spill, military, natural disaster, medical emergency response, a maritime emergency response, a natural disaster response, etc.). Furthermore, it is understood that core GIS data 12 can be captured and stored using any GIS technology.

In some embodiments, core GIS data 12 is preloaded into system 10 from one or more databases, including open data sources, and may include two-dimensional (2D) or three-dimensional (3D) representations. Open data is often used as the basis of projects involving GIS data. For example, data may be obtained from urban modeling projects using sources such as open-Topography, a website that provides downloadable light detection and ranging (LiDAR) data of certain locations. Other sources include ArcGIS, which has been used, e.g., to map and analyze underground electrical lines for earthquake hazards and assessing groundwater quality.

Regardless of the particular use case implemented by system 10, the core GIS data 12 is relatively static in nature (e.g., land parcel maps, fire hydrant locations, etc.,) and is not dependent on information associated with a current incident. When an incident occurs, incident related information is gathered in real time during the actual incident and then integrated with the core GIS data 12. Incident related data may include UAS incident data 14 (e.g., drone images) and/or other incident data 16 (e.g., weather information, social media feeds, user inputs, RFID data, etc.) collected at or associated with the location of the incident.

Figure 4:
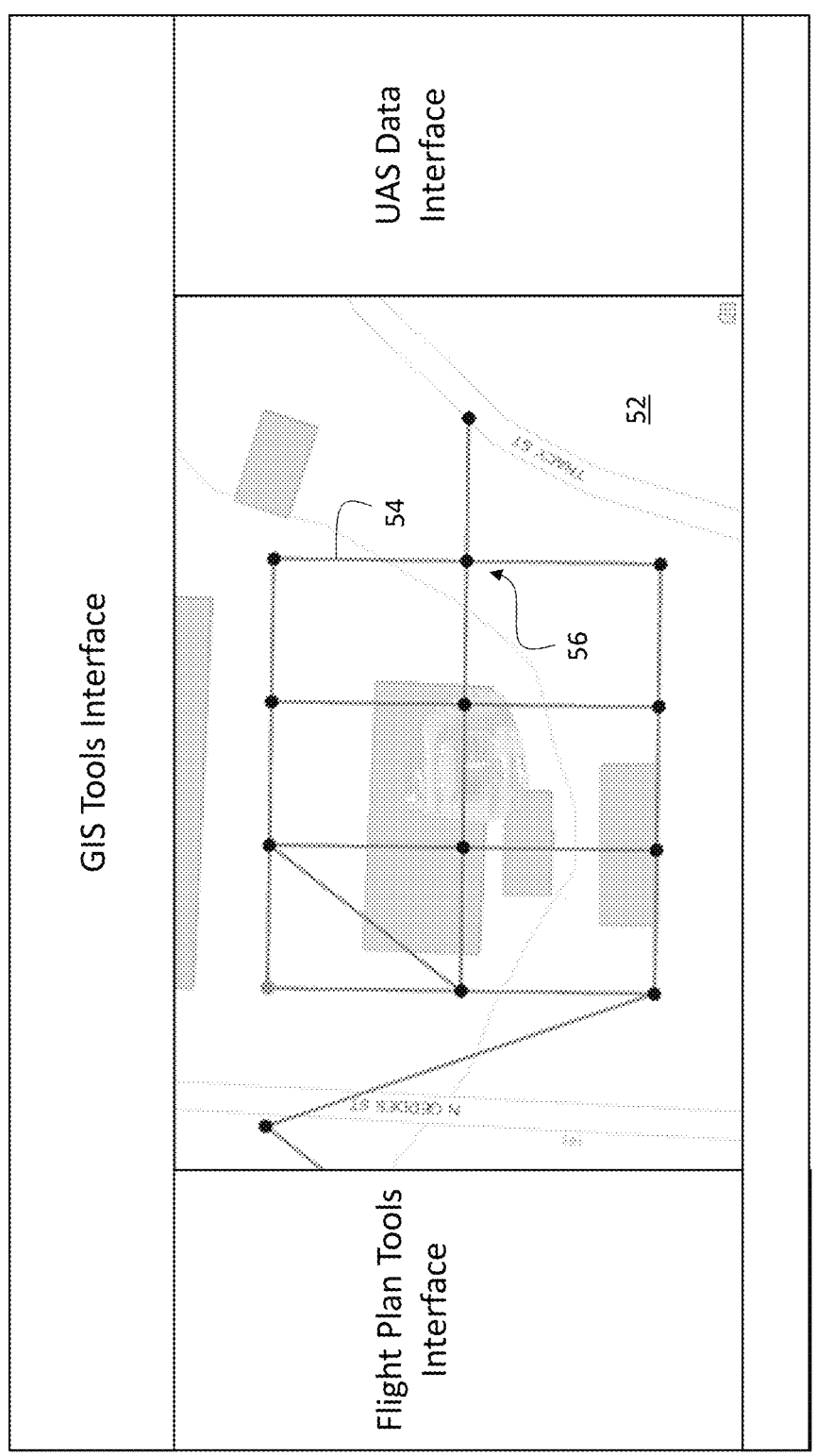
FIG. 4 depicts an interface view of GIS data with a flight plan overlaid, in accordance with an illustrative embodiment.

In one illustrative embodiment, when an incident occurs, one or more UAS devices are deployed at the incident scene to collect UAS incident data 14. This process is managed by UAS data integrator 22 which overlays a flight plan onto the core GIS data 12. Flight plans dictate a path over which a deployed UAS device with travel, and can be calculated at the scene of the incident (e.g., by a drone pilot using augmented reality display 18 or some other system) or loaded from a set of stored flight plans for different geographic locations. Regardless, each flight plan includes path with a set of points that geospatially link the flight path to the core GIS data 12 stored in the system 10. For example, FIG. 4 depicts an illustrative interface 30 that can be rendered on an AR display 18 depicting a flight plan 54 overlaid onto GIS map data 52. Included in the path of the flight plan 54 are a set of dots 56 that represent points at which an image is captured by the UAS device. Image data captured from the UAS device can be displayed within a selected view in interface 30 by selecting/touching one of the dots, which are linked to underlying image metadata (shown in further detail below).

Figure 5:
FIG. 5 depicts a further interface view of GIS data with a flight plan overlaid, in accordance with an illustrative embodiment.

FIG. 5 depicts an alternative view 60 showing a flight plan 62 overlaid onto a map layer 64. Also shown in view 60 are additional GIS data layers including past fire incident layer (shown with fire truck icons 66) and a past violations layer (shown with push pin icons 68). Details of the specific incidents and/or violations can likewise be displayed within the view 60 by selecting/touching one of the icons (shown in further detail below) with the visual information being displayed.

Figure 6:
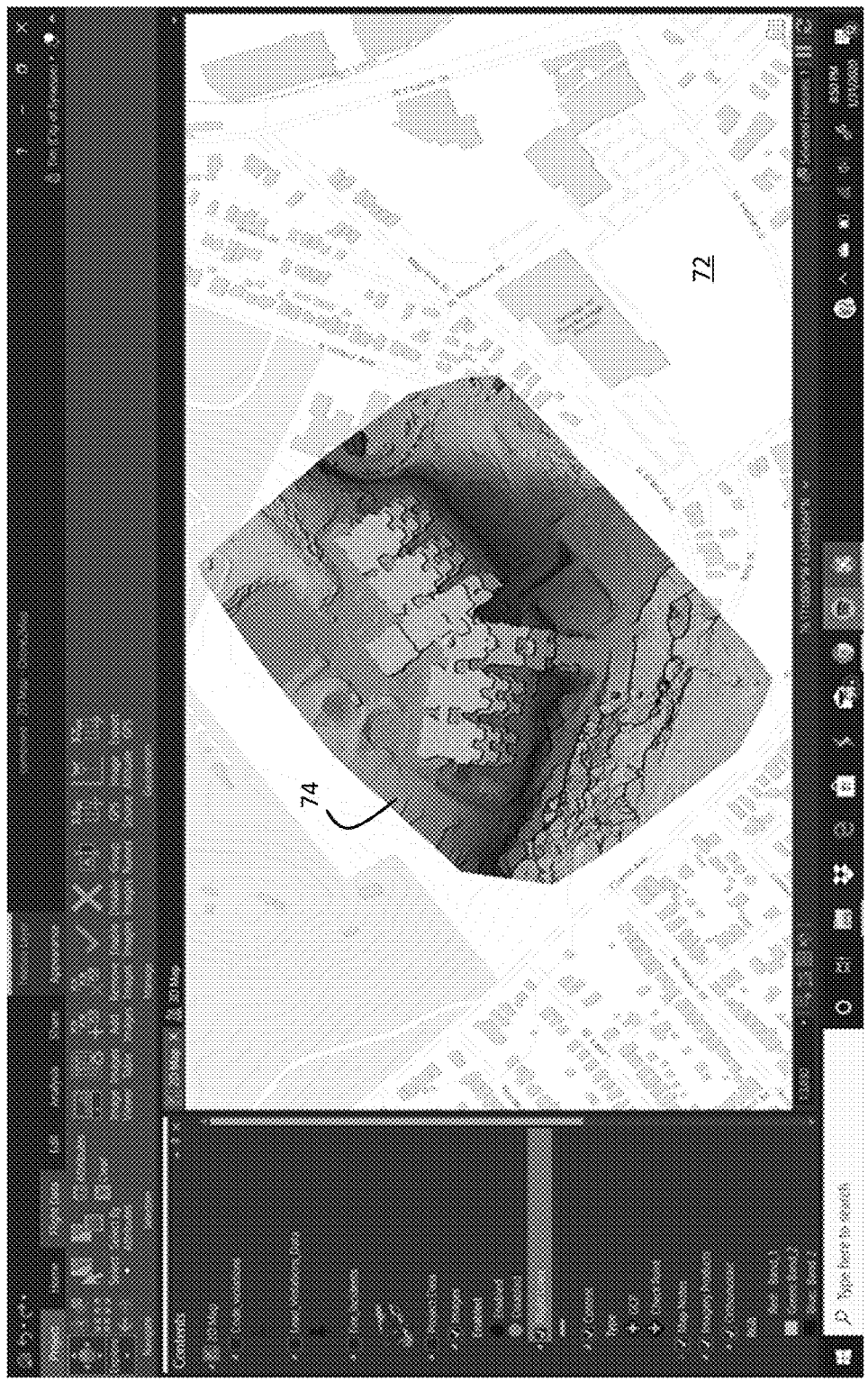
FIG. 6 depicts an interface view of GIS data with thermal imaging overlaid, in accordance with an illustrative embodiment.

As noted, in addition to UAS data 12, system 10 can also integrate other incident data 16, which may, e.g., include: weather data, thermal image data, social media data, RFID data, machine learning generated data, animation data, graphic data, haptic sensor data, holographic or virtual images, emoji data, video data, etc. For example, FIG. 6 depicts a view 70 showing a map layer 72 with thermal information 74 layered thereon, which can for example be useful in understanding how a fire is behaving. As also noted, other incident data 16 may include both structured and unstructured information. For example, structured weather data could be provided to indicate wind direction or rainfall. In still other examples, unstructured social media or 911 data could be processed by a machine learning system to determined potential locations to search for a lost person during a search and rescue operations. For example, someone may report that they saw the missing person at a particular location in a 911 call or on a twitter feed. A natural language processing system could extract the location and time from the conversation/post and load it onto a map view with a generated "report icon". Clicking the icon would, e.g., allow the user to see the actual social media post or listen to the 911 call. Similarly, images taken by bystanders at a fire and posted to a social media site could be geospatially integrated with the GIS data. In other cases radio frequency identification (RFID) tags of first responders or the like could be tracked and displayed.

Figure 7:
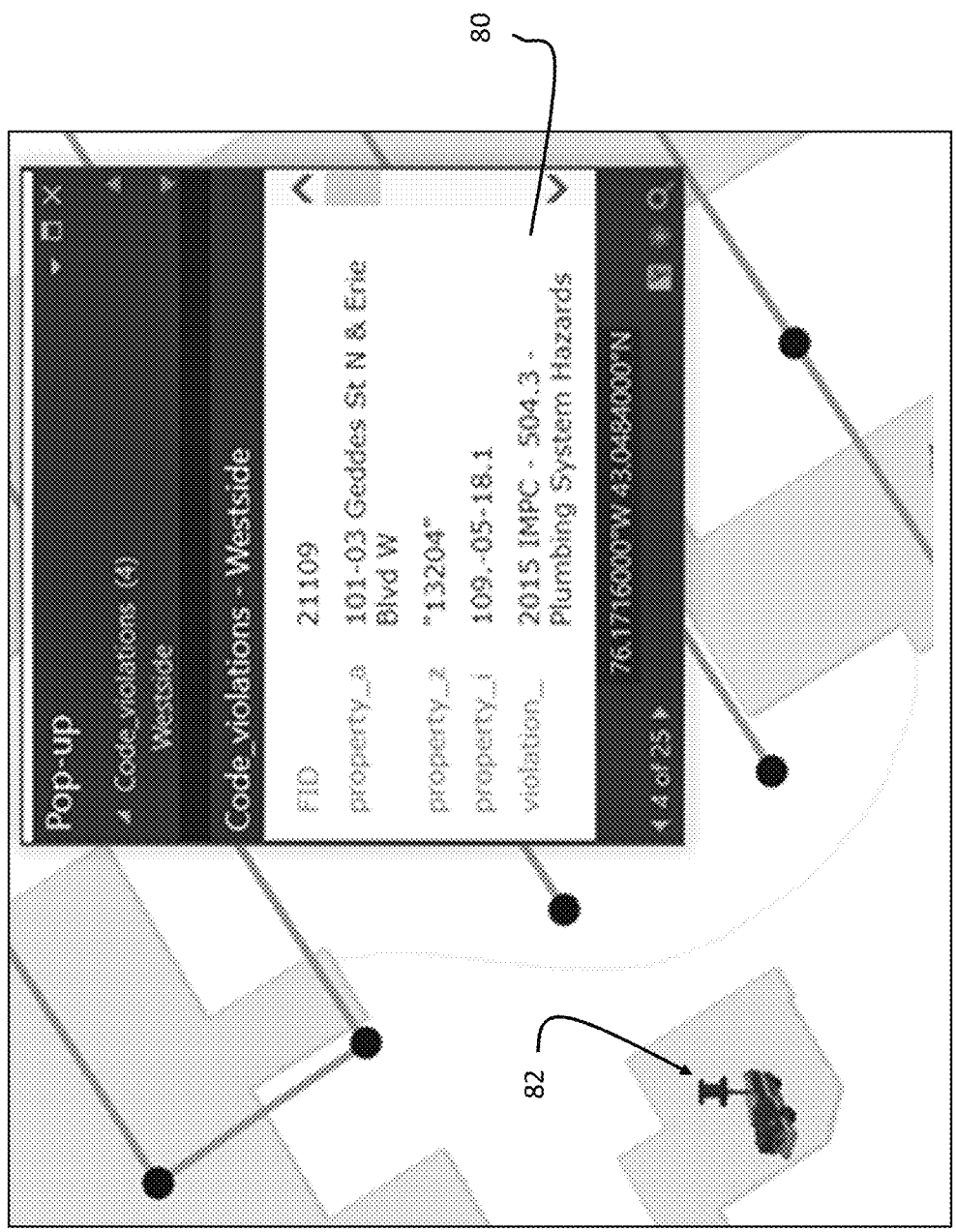
FIG. 7 depicts an interface view with a pop-up window, in accordance with an illustrative embodiment.

As shown in FIG. 1, system 10 includes a visualization system 26 that manages and generates visual decision support interface 30. As noted, the visual decision support interface 30 depicted on augmented reality display 18 is interactive, thereby allowing the user to manage views, select GIS layers for display, select which incident data to display, and view more granular visual information details. In addition to providing tools for controlling views and the like, any depicted item in the visual information (including icons, flight path points, images, pixels, etc.) can link to one or more layers of underlying metadata. Such metadata may for example include displayable information such as weather (e.g., ambient temperature, pressure, dew point, relatively humidity, rainfall, etc.), code violation details, incident details, time and date details, images, audio and video recordings, social media posts, etc. For example, FIG. 7 shows a pop-up window 80 that depicts code violation details displayed in response to the user selecting/touching a pushpin 82 within the displayed view.

Figure 8:
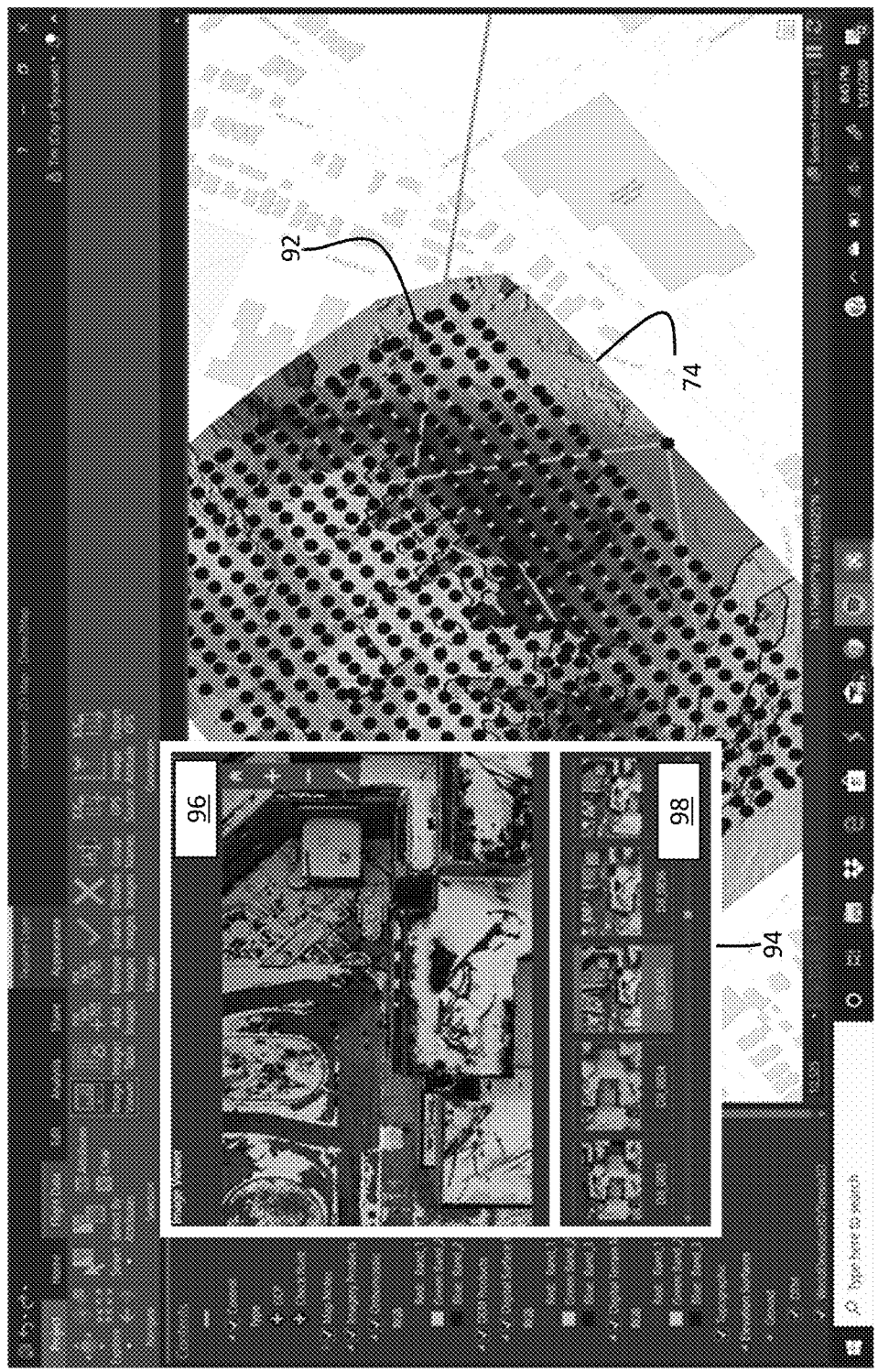
FIG. 8 depicts a further interface view with a pop-up window, in accordance with an illustrative embodiment.

FIG. 8 depicts a further view 90 of the thermal image 74 shown in FIG. 6 that also shows a UAS flight path 92. In this case, a pop-up window 94 is displayed in response to the user selected a point (i.e., one of the dots) along the flight path 92. Pop-up window 94 depicts an image 96 collected by the UAS device at the selected point. Additional adjacent thumbnail images 98 are also shown in the pop-up window 94, allowing the user to select and view UAS images near the currently selected image.

Figure 9:
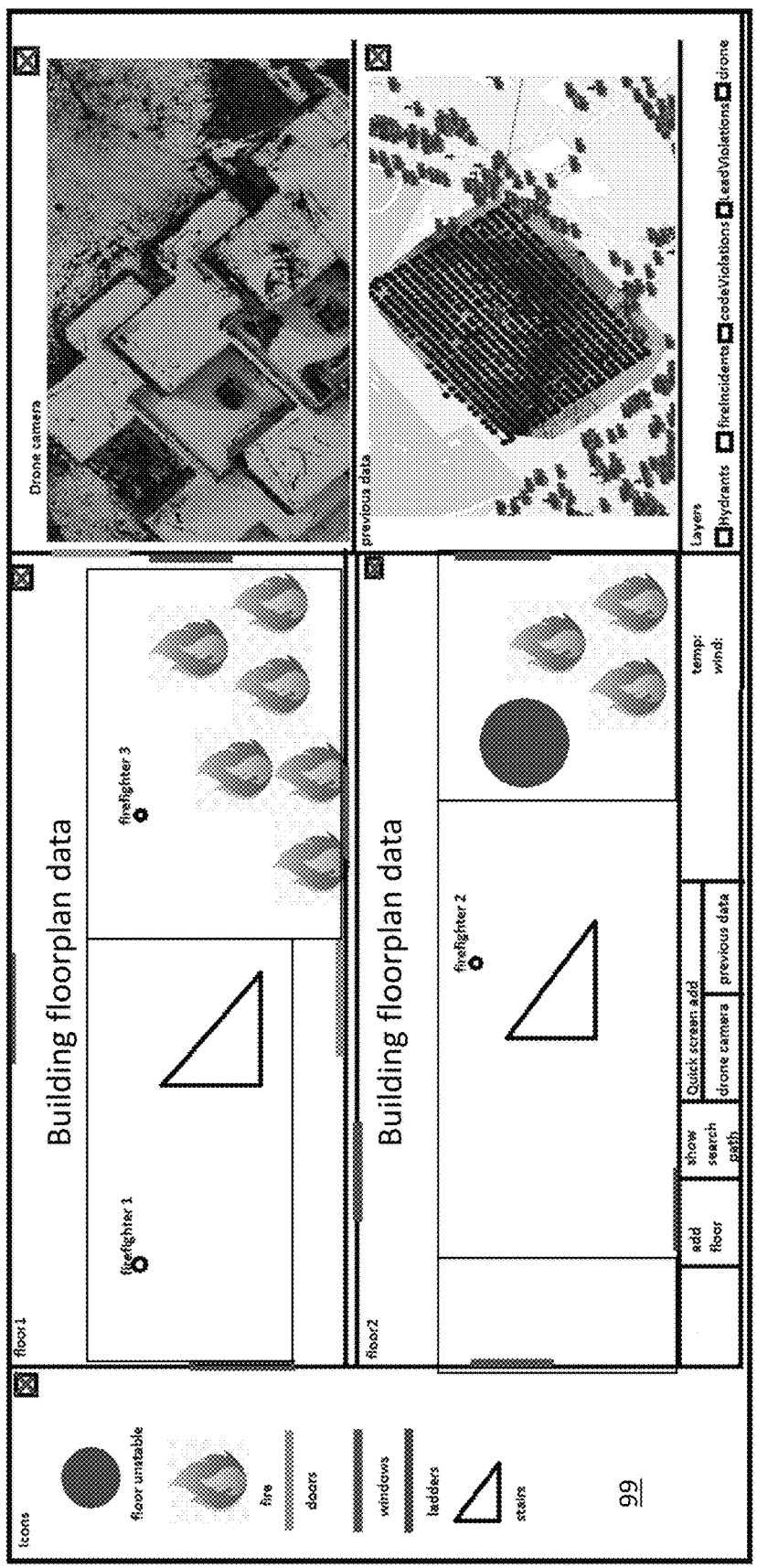
FIG. 9 depicts an interface view with drag and drop key performance indicator icons, in accordance with an illustrative embodiment.

FIG. 9 depicts a further display view in which key performance indicators (in form of icons 99) can be placed and superimposed by the user over displayed visual information in any view, including, e.g., building floorplan data, unstructured UAS camera imagery, map data, etc. In this embodiment, deployable icons 99 (e.g., representing a location of fire, stairs, window, ladder locations, unstable floor locations, percent of fire control, temperature, etc.) can be dragged and dropped quickly and easily onto any view within display 18. Thus, different users (e.g., a person outside a building, a firefighter inside the building, etc.) could deploy icons onto a view and have the icons shared across devices 18 as information is gathered and the incident unfolds. In this case, the view includes a building floor plan and RFID incident data showing the location of the firefighters, and the user has dragged and dropped various icons 99 onto the floor plan. The icons will be shown to other users viewing interface 30 on other devices 18.

Figure 10:
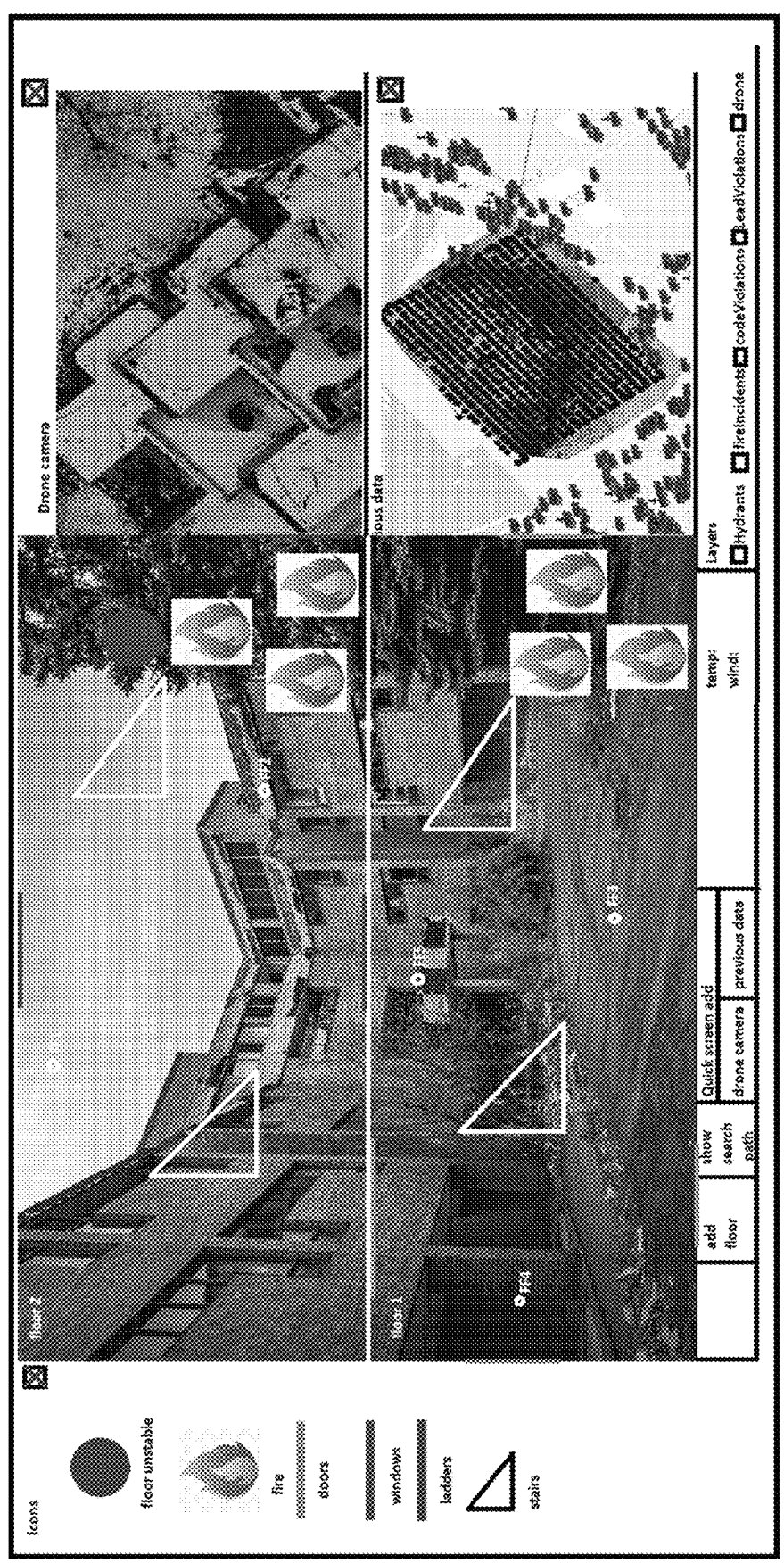
FIG. 10 depicts a further interface view with drag and drop key performance indicator icons, in accordance with an illustrative embodiment.

FIG. 10 depicts a further view in which icons 99 are dropped onto image data by a user. In this example, a user's eye view is presented on the display 18 (e.g., from a head mounted camera), along with UAS camera imagery and overlaid structured and unstructured data. The UAS imagery is shown in the upper right hand corner and flight overlay data is shown in the lower right hand corner. The user-controllable interface on the left hand side allows for user manipulation of icons that represent a real-time fire situation, which are made available to fire fighters on the command team as well as in the building. Utilizing RFID geolocation devices on, e.g., on a firefighter's air pack (e.g., FF1-5) allows for visualization of firefighters and rescue teams in an unfolding fire situation.

Figure 11:
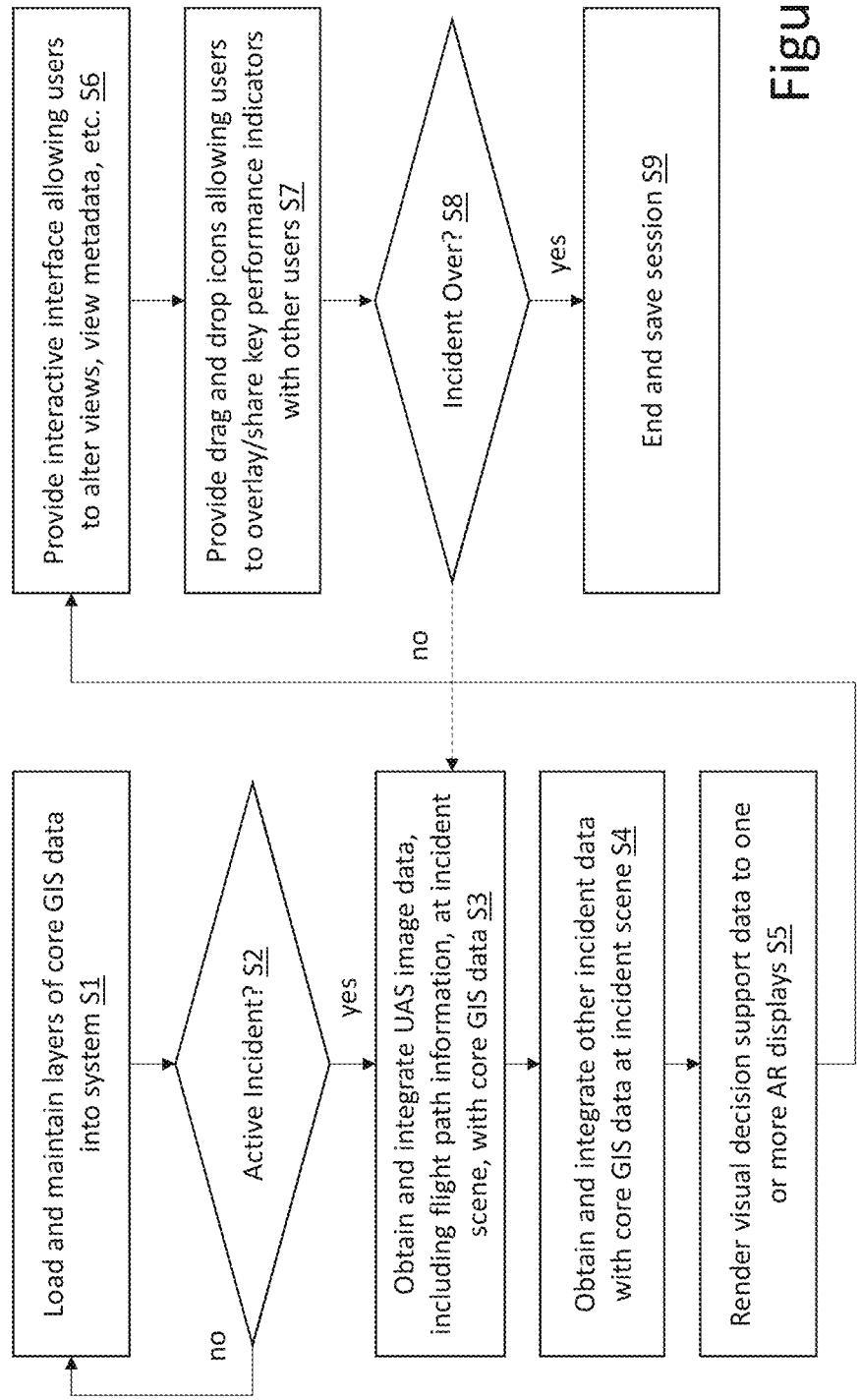
FIG. 11 depicts flow diagram of a process, in accordance with an illustrative embodiment.

FIG. 11 depicts an illustrative method for implementing system 10 (FIG. 1). At S1 layers of core GIS data are loaded and maintained within the system 10 until an active incident occurs at S2. When an incident occurs at S2, UAS image data from the scene, including flight plan data, is obtained and integrated with the core GIS data at S3. At S4, other incident data (e.g., weather data, thermal data, machine learning generated data, RFID data, etc.) is also integrated with the core GIS data. At S5, visual decision support data is rendered to one or more AR displays 18 and at S6, an interactive user interface is provided that allows a user to alter views, view metadata, etc. At S7, drag and drop icons are provided to allow users to overlay and share key performance indicators with other users. Processes S3-S7 repeat until the incident is over at S8. Once the incident is over, the session ends, and details of the session can be saved for later review.

As is evident, system 10 (FIG. 1) provides users requiring real-time decision support data with simplified and decision-impelling visualizations and user interfaces in safety-critical decision support environments. Although generally described with reference to firefighting incidents, it is understood that system 10 could be utilized for any real-time decision support environment. Further any type of information may be integrated and rendered on the visual decision support interface 30, including, e.g., location data, sensor data, historical event and pattern data, infrastructure data, historical and real-time safety data, security data, environmental data, incident narrative data, social media data, vehicle traffic data, utility data, economic data, multimedia data, computer traffic, computer network data, graphical data, medical data, icons, emoticons, emoji's, animation, text data, OCR output, reports, pivot tables, voice data, reports, images, smells, haptic and electrical/electronic signals, etc.

Figure 12:
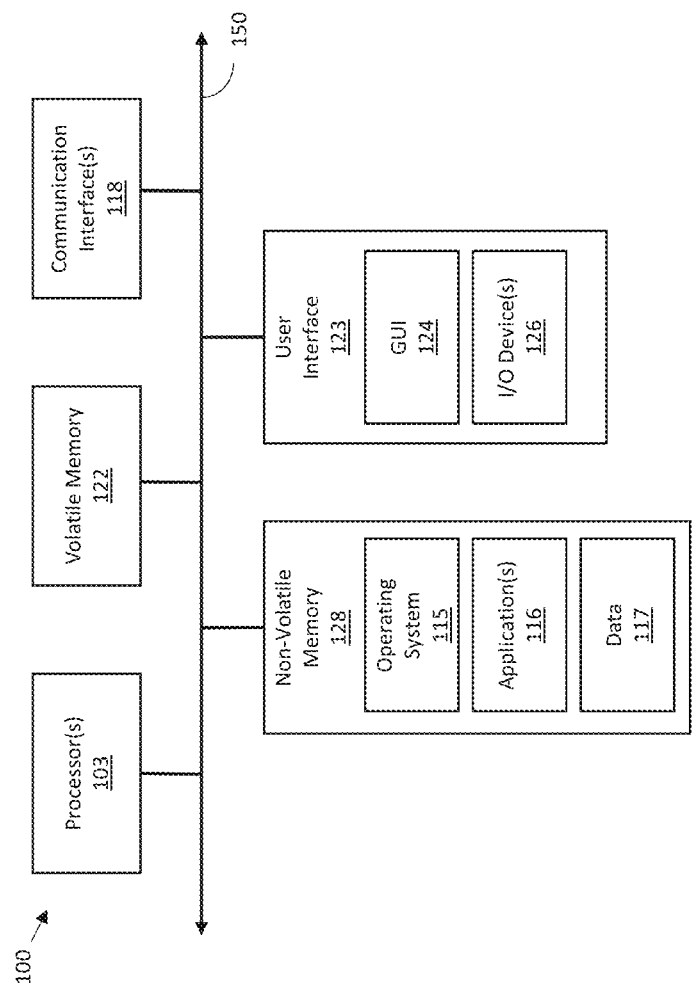
FIG. 12 depicts a computing system, in accordance with an illustrative embodiment.

FIG. 12 depicts a block diagram of a computing device 100 useful for practicing an embodiment of system 10. The computing device 100 includes one or more processors 103, volatile memory 122 (e.g., random access memory (RAM)), non-volatile memory 128, user interface (UI) 123, one or more communications interfaces 118, and a communications bus 150.

The non-volatile memory 128 may include: one or more hard disk drives (HDDs) or other magnetic or optical storage media; one or more solid state drives (SSDs), such as a flash drive or other solid-state storage media; one or more hybrid magnetic and solid-state drives; and/or one or more virtual storage volumes, such as a cloud storage, or a combination of such physical storage volumes and virtual storage volumes or arrays thereof.

The user interface 123 may include a graphical user interface (GUI) 124 (e.g., a touchscreen, a display, etc.) and one or more input/output (I/O) devices 126 (e.g., a mouse, a keyboard, a microphone, one or more speakers, one or more cameras, one or more biometric scanners, one or more environmental sensors, and one or more accelerometers, etc.) The user interface could also be provided as a hologram, projection or as a visualization in augmented, mixed or virtual reality settings.

The non-volatile memory 128 stores an operating system 115, one or more applications 116, and data 117 such that, for example, computer instructions of the operating system 115 and/or the applications 116 are executed by processor(s) 103 out of the volatile memory 122. In some embodiments, the volatile memory 122 may include one or more types of RAM and/or a cache memory that may offer a faster response time than a main memory. Data may be entered using an input device of the GUI 124 or received from the I/O device(s) 126. Various elements of the computer 100 may communicate via the communications bus 150.

The illustrated computing device 100 is shown merely as an example client device or server, and may be implemented by any computing or processing environment with any type of machine or set of machines that may have suitable hardware and/or software capable of operating as described herein. The system may be operating system agnostic and able to use open stack storage and retrieval capabilities, as well as networking and open source database architectures consistent with OSI reference model layers.

The processor(s) 103 may be implemented by one or more programmable processors to execute one or more executable instructions, such as a computer program, to perform the functions of the system. As used herein, the term "processor" describes circuitry that performs a function, an operation, or a sequence of operations. The function, operation, or sequence of operations may be hard coded into the circuitry or soft coded by way of instructions held in a memory device and executed by the circuitry. A processor may perform the function, operation, or sequence of operations using digital values and/or using analog signals. The processes include those produced by or in software systems, operating systems, dynamic memory allocation, as well as those developed algorithmically by robotic process automation.

In some embodiments, the processor can be embodied in one or more application specific integrated circuits (ASICs), microprocessors, digital signal processors (DSPs), graphics processing units (GPUs), microcontrollers, field programmable gate arrays (FPGAs), programmable logic arrays (PLAs), multi-core processors, or general-purpose computers with associated memory.

In some embodiments, the processor 103 may be one or more physical processors, or one or more virtual (e.g., remotely located or cloud) processors. A processor including multiple processor cores and/or multiple processors may provide functionality for parallel, simultaneous execution of instructions or for parallel, simultaneous execution of one instruction on more than one piece of data.

The communications interfaces 118 may include one or more interfaces to enable the computing device 100 to access a computer network such as a Local Area Network (LAN), a Wide Area Network (WAN), a Personal Area Network (PAN), or the Internet through a variety of wired and/or wireless connections, including cellular connections.

In described embodiments, the computing device 100 may execute an application on behalf of a user of a client device. For example, the computing device 100 may execute one or more virtual machines managed by a hypervisor. Each virtual machine may provide an execution session within which applications execute on behalf of a user or a client device, such as a hosted desktop session. The computing device 100 may also execute a terminal services session to provide a hosted desktop environment. The computing device 100 may provide access to a remote computing environment including one or more applications, one or more desktop applications, and one or more desktop sessions in which one or more applications may execute.

Having thus described several aspects of at least one embodiment, it is to be appreciated that various alterations, modifications, and improvements will readily occur to those skilled in the art. Such alterations, modifications, and improvements are intended to be part of this disclosure, and are intended to be within the spirit and scope of the disclosure. Accordingly, the foregoing description and drawings are by way of example only.

Various aspects of the present disclosure may be used alone, in combination, or in a variety of arrangements not specifically discussed in the embodiments described in the foregoing and is therefore not limited in this application to the details and arrangement of components set forth in the foregoing description or illustrated in the drawings. For example, aspects described in one embodiment may be combined in any manner with aspects described in other embodiments.

Also, the disclosed aspects may be embodied as a method, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

What is claimed is:

1. A system for providing visual decision support information, comprising:
 a memory; and a processor coupled to the memory and configured to perform a process that includes: storing a set of layers of core geographic information system (GIS) data associated with a safety critical use case wherein the safety critical use case is selected from a group consisting of: a firefighter response, a medical emergency response, a search and rescue operation, a military operation, a maritime emergency response or a natural disaster response; in response to an active incident, integrating unmanned aerial system (UAS)

incident data with the core GIS data and generating a visual decision support interface that includes a flight plan overlaid onto the core GIS data, wherein the flight plan includes a path with interactive points that link images taken by a UAS to geospatial locations in the core GIS data; in further response to the active incident, integrating at least one of: weather data, thermal image data, social media data, RFID data, machine learning generated data, animation data, graphic data, haptic sensor data, holographic or virtual images, emojis, or video data, with the core GIS data to provide additional visual information to the visual decision support interface; and displaying the visual decision support interface on at least one augmented reality (AR) display, wherein the visual decision support interface includes:

a user interactive tools to control and display different views, projections or sensations of visual information; selectable items within different views of visual information that link to metadata, wherein the metadata is displayable in a pop-up window; and a set of icons that can be deployed onto visual information by a user, and wherein each icon represents a key performance indicator associated with the incident wherein deployed icons are viewable by other users viewing visual information of the incident on a separate AR display, as a holograph, animation, image or projection.

2. The system of claim 1, wherein the safety critical use case comprises a firefighter response and wherein the layers of core GIS data include: map data, past incident data, past violation data, building and structural data, inspection data, safety data, and fire hydrant data.

3. A method for providing visual decision support information, comprising: storing a set of layers of core geographic information system (GIS) data associated with a safety critical use case wherein the safety critical use case is selected from a group consisting of: a firefighter response, a medical emergency response, a search and rescue operation, a military operation, a maritime emergency response or a natural disaster response;

in response to an active incident, integrating unmanned aerial system (UAS) incident data with the core GIS data and generating a visual decision support interface that includes a flight plan overlaid onto the core GIS data, wherein the flight plan includes a path with interactive points that link images taken by a UAS to geospatial locations in the core GIS data;

in further response to the active incident, integrating at least one of: weather data, thermal image data, social media data, RFID data, machine learning generated data, animation data, graphic data, haptic sensor data, holographic or virtual images, emoji data, or video data, with the core GIS data to provide additional visual information to the visual decision support interface; and displaying the visual decision support interface on at least one augmented reality (AR) display, wherein the visual decision support interface includes:

a user interactive tools to control and display different views, projections or sensations of visual information; selectable items within different views of visual information that link to metadata, wherein the metadata is displayable in a pop-up window; and a set of icons that can be deployed onto visual information by a user, and wherein each icon represents a key performance indicator associated with the incident wherein deployed icons are viewable by other users viewing visual information of the incident on a separate AR display, as a holograph, animation, image or projection.

4. The method of claim 3, wherein the safety critical use case comprises a firefighter response and wherein the layers of core GIS data include: map data, past incident data, past violation data, building and structural data, inspection data, safety data, and fire hydrant data.

5. The method of claim 3, wherein the visual decision support interface displayed on the at least one augmented reality (AR) display is displayed as a holograph, animation, image or projection.

* * * * *